(12) United States Patent
Kim

(10) Patent No.: US 11,290,993 B2
(45) Date of Patent: Mar. 29, 2022

(54) METHOD FOR TRANSMITTING CONTROL INFORMATION FOR MUST TRANSMISSION IN WIRELESS COMMUNICATION SYSTEM AND DEVICE THEREFOR

(71) Applicant: LG ELECTRONICS INC., Seoul (KR)

(72) Inventor: Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 15/767,942

(22) PCT Filed: Oct. 26, 2016

(86) PCT No.: PCT/KR2016/012073
§ 371 (c)(1),
(2) Date: Apr. 12, 2018

(87) PCT Pub. No.: WO2017/074014
PCT Pub. Date: May 4, 2017

(65) Prior Publication Data
US 2020/0245300 A1 Jul. 30, 2020

Related U.S. Application Data

(60) Provisional application No. 62/321,717, filed on Apr. 12, 2016, provisional application No. 62/317,458, (Continued)

(51) Int. Cl.
*H04W 72/04* (2009.01)
*H04B 7/06* (2006.01)
*H04B 7/0452* (2017.01)

(52) U.S. Cl.
CPC ............... *H04W 72/042* (2013.01)

(58) Field of Classification Search
USPC ........................................................ 370/329
See application file for complete search history.

(56) References Cited

U.S. PATENT DOCUMENTS 8,553,595 B2 * 10/2013 Laroia ............... H04L 5/04
370/310
2007/0286238 A1 12/2007 Wang et al.
(Continued)

FOREIGN PATENT DOCUMENTS

CN 102165714 A 8/2011
CN 103327532 A 9/2013
(Continued)

OTHER PUBLICATIONS

Lee et al. Multiuser Superposition Transmission (MUST) for LTE-A Systems, IEEE (Year: 2016).*
(Continued)

*Primary Examiner* — Jeffrey M Rutkowski
*Assistant Examiner* — Luna Weissberger
(74) *Attorney, Agent, or Firm* — Birch, Stewart, Kolasch & Birch, LLP

(57) ABSTRACT

The present application provides a method for receiving a downlink signal from a base station by a terminal in a wireless communication system. Specifically, the method comprises: when a downlink control signal from the base station includes a multi-user superposition transmission (MUST) application indicator, acquiring information for an interference signal and information for a downlink data signal included in the downlink control signal; and receiving the downlink data signal on the basis of the information for the downlink data signal and the information for the interference signal.

6 Claims, 10 Drawing Sheets

Related U.S. Application Data filed on Apr. 1, 2016, provisional application No. 62/249,337, filed on Nov. 1, 2015.

(56) References Cited

U.S. PATENT DOCUMENTS

| | | | |
|---|---|---|---|
| 2013/0315085 A1* | 11/2013 | Krishnamurthy | ... H04L 27/2647 370/252 |
| 2014/0314006 A1 | 10/2014 | Suh et al. | |
| 2015/0147994 A1 | 5/2015 | Tsai et al. | |
| 2016/0100413 A1* | 4/2016 | Hwang | ............... H04W 72/082 370/330 |
| 2016/0262161 A1* | 9/2016 | Li | .......................... H04L 5/0051 |
| 2018/0124708 A1* | 5/2018 | Davydov | ............ H04W 52/143 |

FOREIGN PATENT DOCUMENTS

| | | |
|---|---|---|
| EP | 1602184 B1 | 9/2012 |
| WO | WO 2014/122994 A1 | 8/2014 |

OTHER PUBLICATIONS

Alcatel-Lucent Shanghai Bell et al., "Enhancements to Support Downlink Multiuser Superposition," 3GPP TSG RAN WG1 Meeting #82bis, R1-155252, Malmö, Sweden, Oct. 5-9, 2015, 5 pages.

ASUSTeK, "Discussion on Scheduling Information for MUST Receivers," 3GPP TSG-RAN WG1 Meeting #82bis, R1-155827, Malmö, Sweden, Oct. 5-9, 2015, 3 pages.

LG Electronics, "Potential assistance information and signaling schemes for MUST," 3GPP TSG RAN WG1 Meeting #82bis, R1-155409, Malmö, Sweden, Oct. 5-9, 2015, pp. 1-4.

Mediatek Inc., "Potential Enhancements for MUST," 3GPP TSG RAN WG1 Meeting #82bis, R1-155701, Malmö, Sweden, Oct. 5-9, 2015, 5 pages.

Besbes et al., "Resource Allocation Algorithm in Downlink of OFDMA Systems Based on Users' Classification and Superposition Coding," 2009 International Conference on Signals, Circuits and Systems, 2009, pp. 1-6.

ZTE, "Enhanced superposition schemes for MUST," R1-151722, 3GPP TSG-RAN WG1 #80bis, Belgrade, Serbia, Apr. 20-24, 2015, 3 pages.

\* cited by examiner

FIG. 2
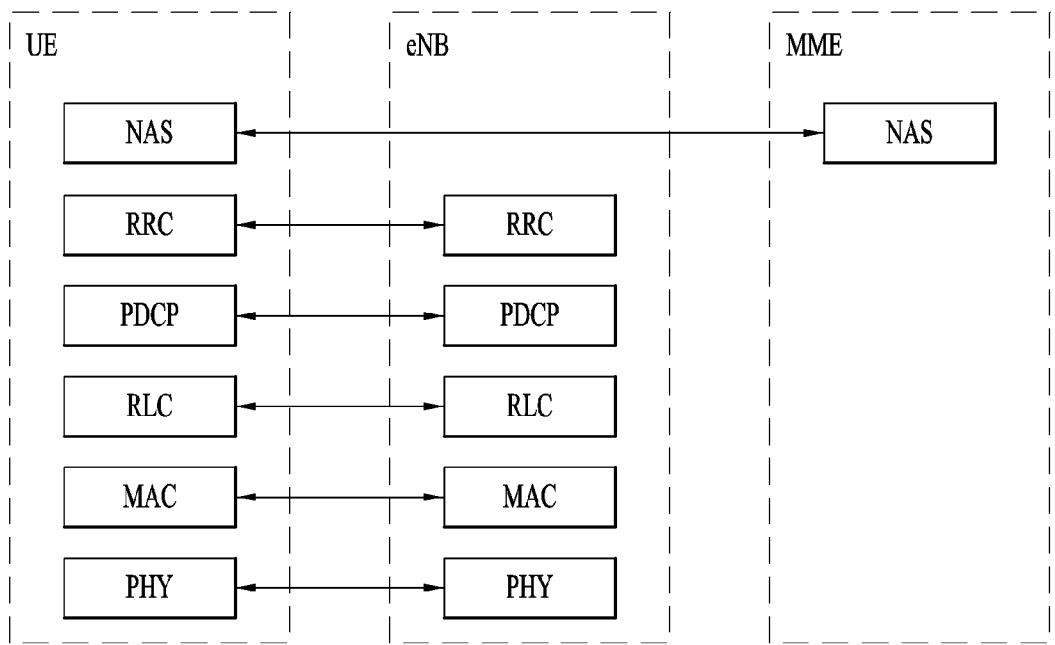
(a) Control-Plane Protocol Stack
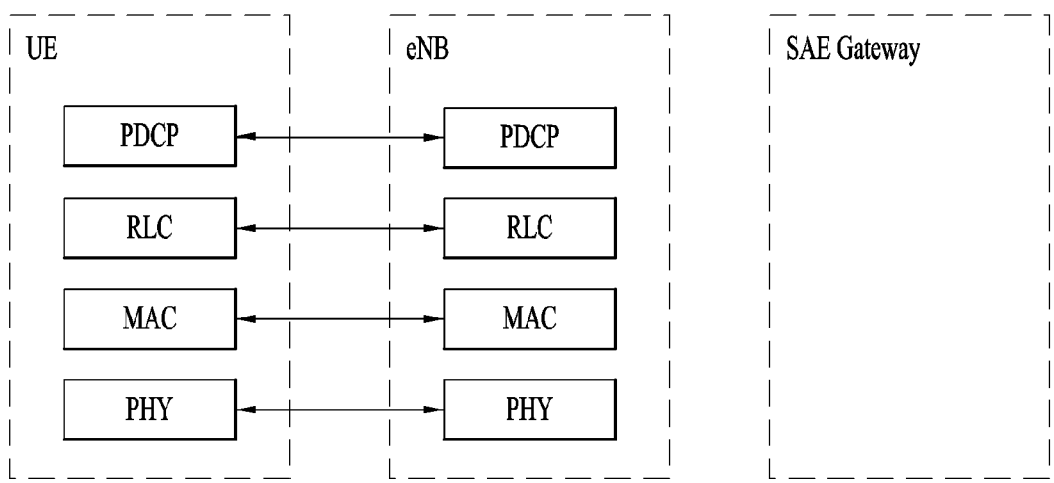
(b) User-Plane Protocol Stack

METHOD FOR TRANSMITTING CONTROL INFORMATION FOR MUST TRANSMISSION IN WIRELESS COMMUNICATION SYSTEM AND DEVICE THEREFOR

CROSS REFERENCE TO RELATED APPLICATIONS

This application is the National Phase of PCT International Application No. PCT/KR2016/012073, filed on Oct. 26, 2016, which claims priority under 35 U.S.C. 119(e) to U.S. Provisional Application No. 62/249,337, filed on Nov. 1, 2015, No. 62/317,458, filed on Apr. 1, 2016 and No. 62/321,717, filed on Apr. 12, 2016, all of which are hereby expressly incorporated by reference into the present application.

TECHNICAL FIELD

The present invention relates to a wireless communication system, and more particularly, to a method for transmitting control information for MUST (Multi-User Superposition Transmission) in a wireless communication system and a device therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARM)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

Based on the aforementioned discussion, an object of the present invention is to provide a method for transmitting control information for MUST (Multi-User Superposition Transmission) in a wireless communication system and a device therefor.

Technical Solution

According to one aspect of the present invention, a method for receiving, by a UE, a downlink signal from an eNB in a wireless communication system comprises the steps of receiving a downlink control signal from the eNB; acquiring information for an interference signal and information for a downlink data signal included in the downlink control signal when the downlink control signal includes a multi-user superposition transmission (MUST) application indicator; and receiving the downlink data signal on the basis of the information for the downlink data signal and the information for the interference signal.

According to another aspect of the present invention, a UE in a wireless communication system comprises a radio frequency (RF) module; and a processor acquiring information for an interference signal and information for a downlink data signal included in a downlink control signal when the downlink control signal received from an eNB includes a multi-user superposition transmission (MUST) application indicator, and receiving the downlink data signal on the basis of the information for the downlink data signal and the information for the interference signal.

In this case, the interference signal is a downlink data signal of another UE which is MUST paired.

Preferably, the information for the downlink data signal includes a modulation order and a transport block size of the downlink data signal of the UE, and includes a modulation order of a downlink data signal of another UE.

Preferably, the information for the downlink data signal includes power information of the downlink data signal of the UE, and includes power information of the downlink data signal of another UE.

Preferably, the downlink control information includes information as to whether a power of the downlink data signal of another UE is the same as that of a downlink reference signal for the downlink data signal of another UE.

More preferably, the downlink control information may include information as to whether a precoder applied to the downlink data signal is the same as a precoder applied to the interference signal.

Additionally, the UE may report information as to the existence of control capability of the interference signal to the eNB.

Advantageous Effects

According to the embodiment of the present invention, MUST may be performed more efficiently in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification;

BEST MODE FOR CARRYING OUT THE INVENTION

Figure 1:
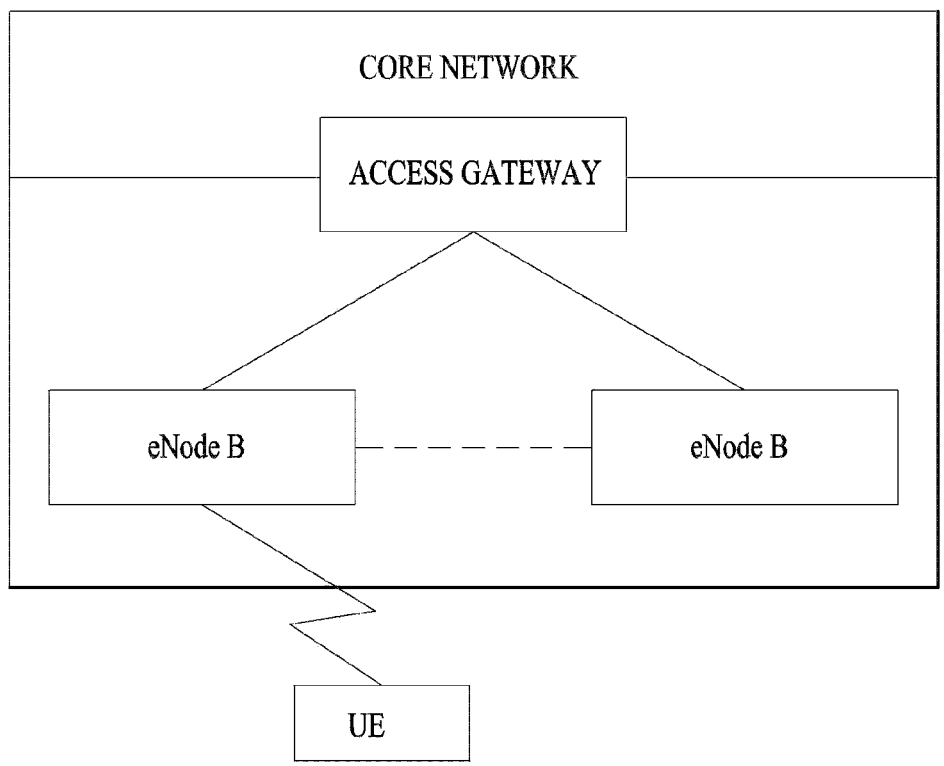
FIG. 1 is a diagram schematically illustrating a network structure of an evolved universal mobile telecommunications system (E-UMTS) as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3 GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer.

A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is set to one of bandwidths of 1.25, 2.5, 5, 10, 15, and 20 MHz to provide a downlink or uplink transmission service to multiple UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
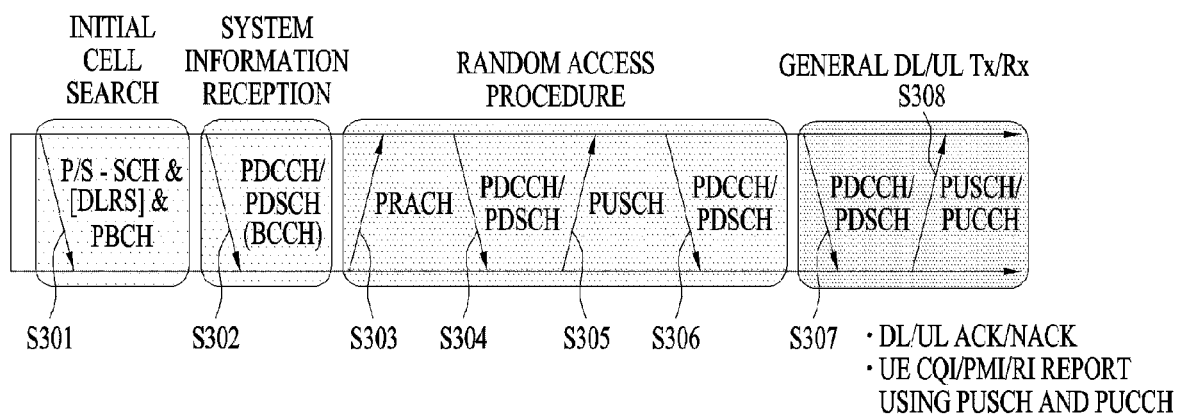
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DLRS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
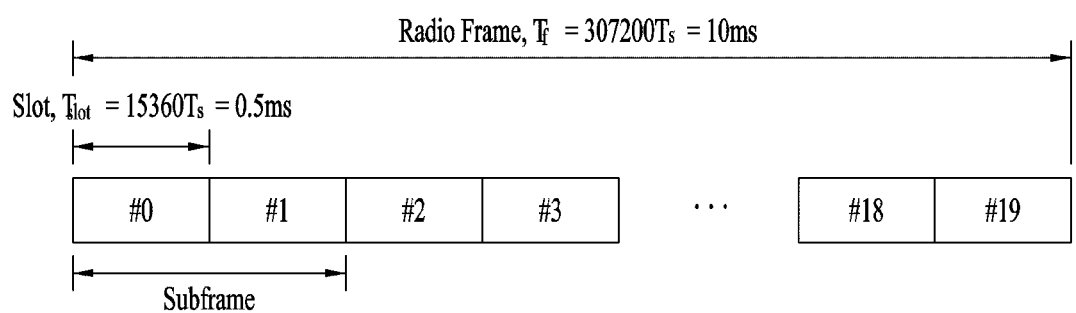
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
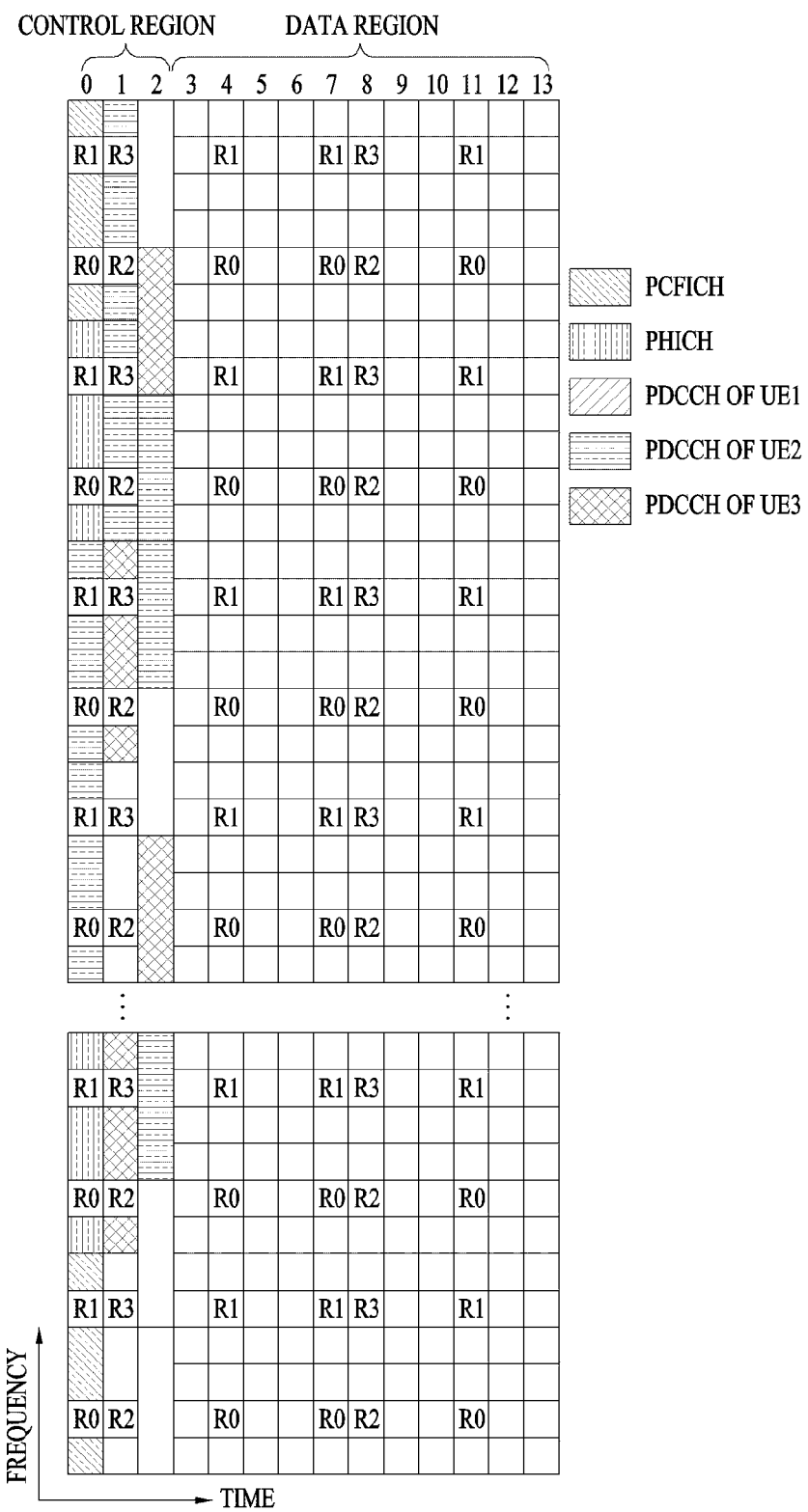
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
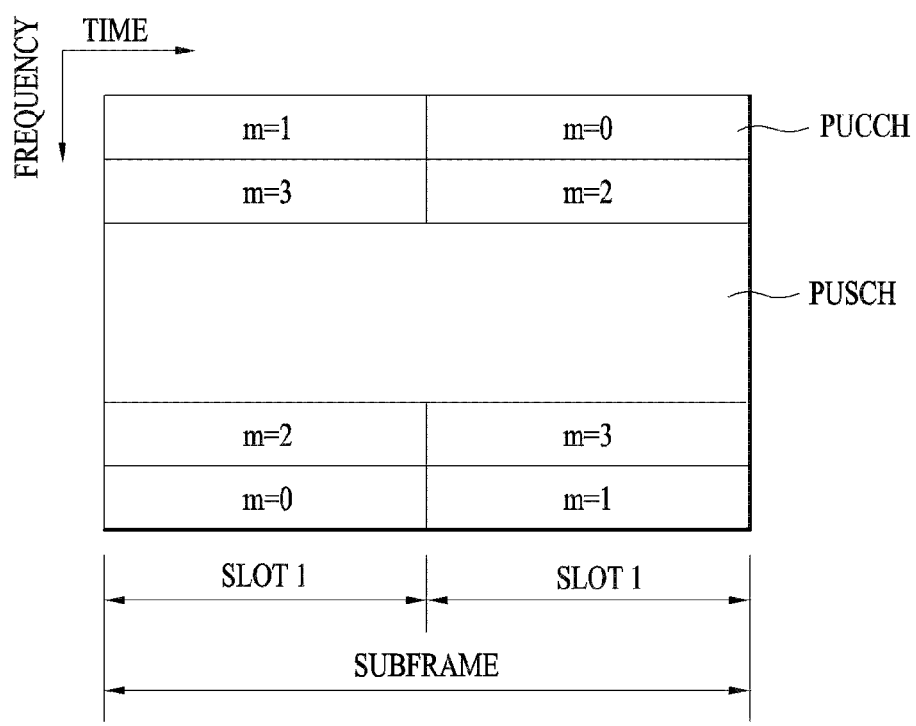
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

The present invention provides a method for performing signaling and specific operations required for an interference cancellation receiver in a multi-user superposition transmission (MUST) system. MUST refers to a multiple access scheme that may achieve high bandwidth efficiency by allocating a plurality of UEs to the same frequency-time resources using a preset power ratio and mitigating preset inter-user interference, basically based on the premise that a signal is transmitted to the interference cancellation receiver, in addition to time-frequency domain resource allocation of a legacy OFDMA system. MUST is under discussion as a significant candidate technology for a future 5th generation (5G) system.

Resource allocation of an eNB and interference cancellation of a UE are important techniques in the MUST system. Particularly, receivers may be classified into symbol level interference cancellation (SIC) receivers represented by a maximum likelihood (ML) receiver, and codeword level interference cancellation (CWIC) receivers represented by a minimum mea-square error (MMSE)-based linear CWIC (L-CWC) receiver and an ML-CWC receiver, depending on their interference cancellation schemes. A reception gain is different in a given environment according to each interference cancellation scheme. In general, an ML receiver and a CWIC receiver achieve high gains in proportion to the implementation complexity of a UE.

Figure 7:
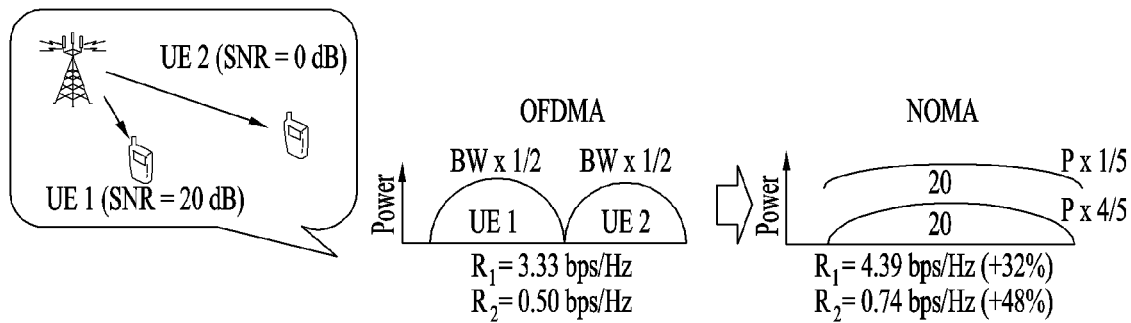
FIGS. 7 and 8 are conceptual views illustrating an interference cancellation scheme in a multi-user superposition transmission (MUST) system.
Figure 8:
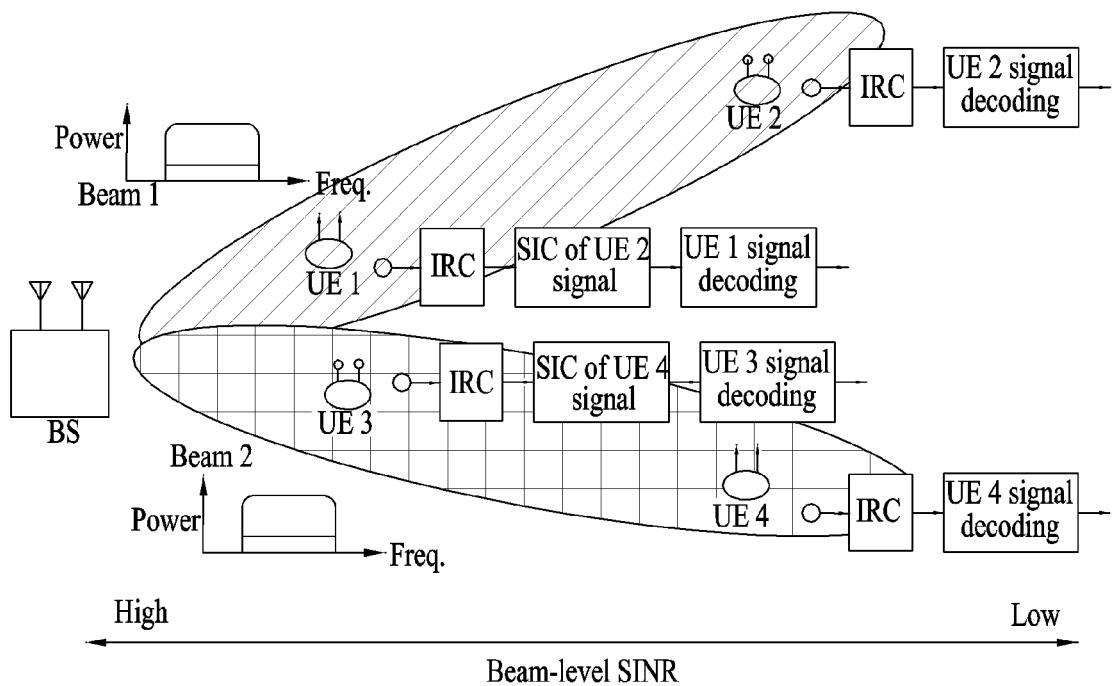

FIGS. 7 and 8 are conceptual views of an interference cancellation scheme in a MUST system.

FIG. 7 conceptually illustrates the difference between the legacy OFDMA system and the MUST system. Particularly, it is assumed in FIG. 7 that the signal to noise ratio (SNR) of a first UE (UE1) is 20 dB and the SNR of a second UE (UE2) is 0 dB.

Specifically, in the legacy OFDMA system, UE1 and UE2 receive DL signals with the same power, using equal halves of a bandwidth, that is, in different frequency bands. In this case, a data rate per frequency of UE1 is 3.33 bps/Hz and a data rate per frequency of UE2 is 0.5 bps/Hz. In the MUST system, each of UE1 and UE2 uses a total band. 4/5 of total transmission power is allocated to UE2, whereas 1/5 of the total transmission power is allocated to UE1. In this case, the data rate per frequency of UE1 is increased to 4.39 bps/Hz and the data rate per frequency of UE2 is increased to 0.74 bps/Hz.

FIG. 8 is a schematic view illustrating a signal reception operation in the MUST system. Specifically, an eNB transmits signals to which the same beamforming has been applied to UE1 and UE2 in the same time/frequency resources. In this case, although UE2 also receives a signal intended for UE1, the impact of the signal of UE1 is negligibly small because of a reception power difference. Thus, UE2 may decode a signal intended for UE2 simply by an interference rejection combining (IRC) algorithm. On the other hand, only after removing the transmission signal intended for UE2, that is, performing an SIC operation on the signal of UE2 in addition to the IRC algorithm, UE1 may decode the signal intended for UE1.

Likewise, the eNB transmits signals to which the same beamforming has been applied to a third UE (UE3) and a fourth UE (UE4) in the same time/frequency resources. In this case, although UE4 also receives a signal intended for UE3, the impact of the signal is negligibly small because of a reception power difference. Thus, UE4 may decode a signal intended for UE4 simply by the IRC algorithm. On the other hand, only after removing the transmission signal intended for UE4, that is, performing an SIC operation on the signal of UE4 in addition to the IRC algorithm, UE3 may decode the signal intended for UE3.

As described in FIGS. 7 and 8, downlink data for a plurality of UEs are transmitted using the same time and the same frequency through the MUST system. At this time, a near UE located near the eNB, having excellent geometry is paired with a far UE far away from the eNB, and thus receives a downlink service, uses more than a half of the overall power for data of the far UE, and uses the other power for the near UE.

Since the far UE partially interferes with data of the near UE but a transmission power carried in the data of the near UE is weaker than a data power of the far UE and a size of the interference is weak due to high path loss, the far UE may receive data without advanced IC (interference cancellation) such as SLIC (Symbol-level Interference Cancellation)/ML (Maximum likelihood)/CWIC (Codeword level interference Cancellation). On the other hand, since the near UE is greatly affected by interference of the far UE, the near UE attenuates interference by using IC such as SLIC/ML/CWIC and receives data.

Figure 9:
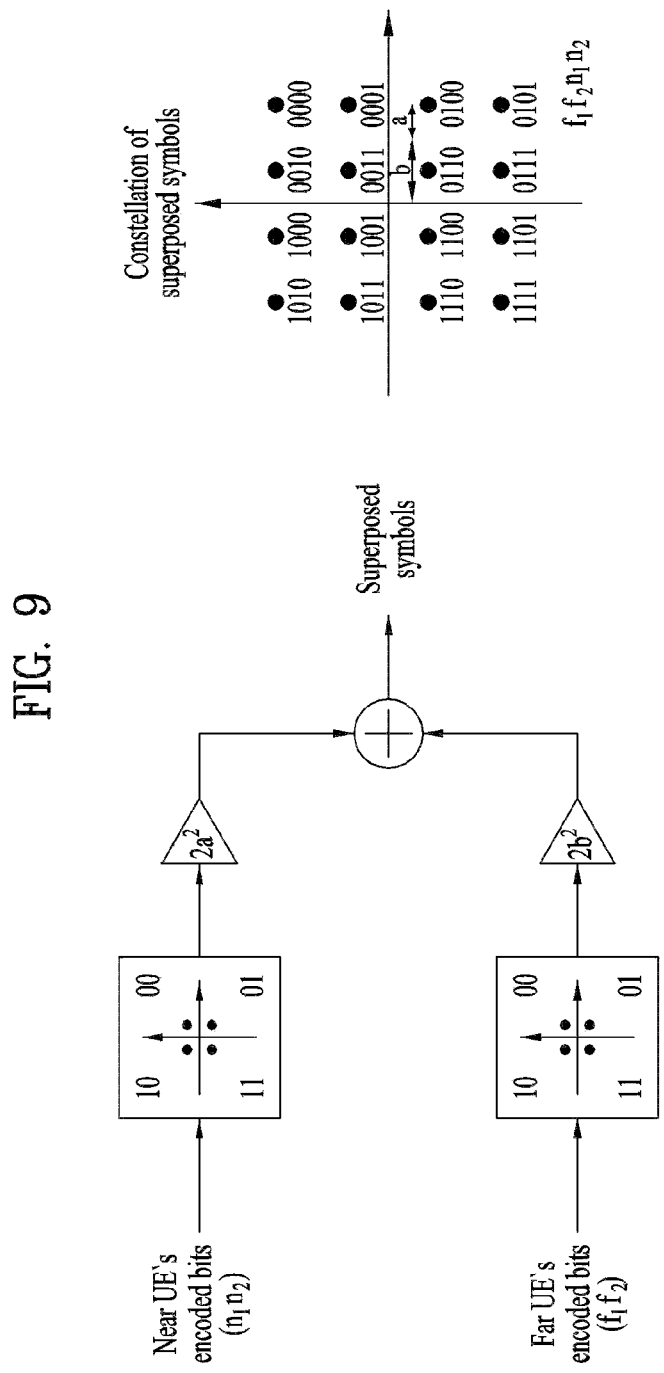
FIG. 9 is a diagram illustrating an example of one of transmission schemes of MUST system.

Various transmission schemes exist in the MUST system. FIG. 9 illustrates one example of transmission schemes of the MUST system.

Referring to FIG. 9(a), information bits corresponding to data of the near UE and information bits corresponding to data of the far UE are converted into coded bits through their respective channel coding. Afterwards, the coded bits of each UE respectively pass through a modulator, whereby constellation symbols of the near UE and the far UE are respectively generated. Then, a power is properly allocated to each constellation symbol and then two constellation symbols are combined with each other to generate a superposed symbol.

For example, it is assumed that the coded bits of the near UE and the coded bits of the far UE are 00 and 11, respectively. In this case, constellation symbols of each UE are generated through QPSK modulation and power allocation is performed. Afterwards, two QPSK symbols are combined with each other to generate one superposed symbol. One superposed symbol generated as above is illustrated in FIG. 9(b), and is subjected to layer mapping and precoding and then transmitted through an eNB antenna.

Meanwhile, in the recent 3GPP standard, categories of the MUST system are defined as listed in Table 1 below.

TABLE 1

| | |
|---|---|
| Category 1 | Superposition transmission with adaptive power ratio on component constellations and non-Gray-mapped composite constellation |
| Category 2 | Superposition transmission with adaptive power ratio on component constellations and Gray-mapped composite constellation |
| Category 3 | Superposition transmission with label-bit assignment on composite constellation and Gray-mapped composite constellation |

In the recent LTE standard, it has been discussed that a UE (hereinafter, referred to as MUST UE, and the MUST UE may be a high geometry UE or a low geometry UE) which receives data through MUST in accordance with Table 1 provides predetermined assistance information to efficiently cancel interference caused by data of the other UE (that is, MUST paired UE), which are transmitted by superposition together with its data. This example is illustrated in Table 2 below.

TABLE 2

The following should be considered as potential PDSCH assistance information for MUST Category 1, 2, and 3 UE.
  For MUST Category 1, 2, and 3
    (R-)ML/SLIC (available receiver type for far UE or near UE)
      Existence/processing of MUST interference (per spatial layer if same beam restriction is applied)
      Modulation order of MUST paired UE
      Transmission power allocation of its PDSCH and MUST paired UE's PDSCH (per spatial layer if different power can be allocated to each spatial layer)
      Resource allocation of MUST paired UE
      PDSCH RE mapping information of MUST paired UE (if it is different from its own PDSCH RE mapping information, e.g. PDSCH starting symbol or PDSCH RE mapping at DMRS RE)
      DMRS information of MUST paired UE (if DMRS information is used to estimate effective channel of MUST paired UE or to derive power allocation of MUST paired UE)
      Transmission scheme of MUST paired UE (if mixed transmission schemes, e.g transmit diversity and closed-loop spatial multiplexing)
      Preceding vector(s) of MUST paired UE
    CWIC (available receiver type for near UE)
      The above potential assistance information for ML receiver
        TBS of MUST paired UE
        HARQ information of MUST paired UE
        LBRM (Limited Buffer Rate Matching) assumption of MUST paired UE
        Parameters for descrambling and CRC checking for the PDSCH of the MUST paired user
    MMSE-IRC (available receiver type for far UE)
      Transmission power allocation of its PDSCH and MUST paired UE's PDSCH
  Additionally, the followings should be considered potential assistance information for Category 3.
    For MMSE IRC, SLIC, (R-)ML, and CWIC
      Modulation order of composite constellation
      Bit allocation information of composite constellation The information of Table 2 above may be signaled from the eNB to the MUST UE through DCI of PDCCH. However, PDSCH scheduling information of the received UE only exists in the legacy DCI, and assistance information for interference cancellation does not exist therein. Therefore, assistance information may simply be added to the legacy DCI as a new bit field. For this reason, a problem occurs in that DCI overhead is increased. Therefore, it is effective that addition of a new bit field is minimized and the legacy field is redefined.

Therefore, in the present invention, DCI formats, that is, DCI format 2 and DCI format 2C of TM (transmission mode) 4 and TM 9 considered that the MUST system will be applied will be suggested as examples, and how the corresponding DCI format is corrected and includes assistance information will be described. This suggestion will be applied to even another DCI format equally or similarly, whereby the corresponding DCI format may include assistance information.

<Signaling of the Existence of MUST Interference>

Information indicating that MUST has been performed for the UE and information indicating that an interference signal subjected to MUST should be controlled may be provided using assistance information (hereinafter, AI) indicating the existence of interference. The corresponding information may simply be expressed as 1 bit. More elaborately, if the number of received layers of the UE is N, it is preferable to notify each layer of the existence of MUST interference. That is, assistance information indicating the existence of MUST interference may be expressed as N bits.

The present invention suggests that a resource allocation (RA) header of a 1-bit size of fields of the legacy DCI should be redefined for corresponding AI transmission. That is, the RA header of a 1-bit size is redefined as information on the existence of MUST interference and information (i.e., information on type 0 or type 1) on resource allocation type conventionally delivered to the RA header is excluded from the DCI. The information on resource allocation type may be signaled to the UE semi-statically through a higher layer signal such as RRC, or is fixed to type 0 or type 1. According to the current LTE standard, if a narrow bandwidth (BW) of 10 RBs or less is used, the RA header does not exist and type 0 is always used. However, to perform MUST for a narrow bandwidth of 10 RBs or less, 1-bit field for corresponding AI should always exist.

Otherwise, a flag bit which has a 1-bit size among fields of the legacy DCI for corresponding AI transmission and indicates swapping between a transport block (TB) and a codeword may be redefined. That is, the flag bit of a 1-bit size is redefined as the information on the existence of MUST interference, and information indicating swapping between the TB and the codeword is excluded from the DCI. As a result, TB i is fixedly mapped into codeword i.

Otherwise, both the resource allocation (RA) header of a 1-bit size and the swapping flag bit of a 1-bit size may be redefined. In this case, 2 bits are used for AI information transfer. This is effective when the existence of MUST interference per layer is notified to the UE. For example, the existence of MUST interference per layer may be notified to the UE which is able to receive two layers.

The UE recognizes that the other field of the DCI have been redefined if MUST interference exists, and interprets a corresponding field in accordance with the redefined scheme, and interprets the corresponding field in accordance with the legacy scheme if MUST interference does not exist. It will be apparent that the aforementioned suggestion may be used for the other AI (for example, modulation order of interference PDSCH, transmission power of interference PDSCH, etc.) in addition to the information on the existence of MUST interference.

The existence of MUST interference may be defined per frequency and time resources. For example, when the near UE is scheduled at subbands 1, 2 and 3 at a specific time and near UE data are transmitted together with far UE data through MUST at subbands 1 and 2 but near UE data are transmitted at subband 3, the UE should know that MUST interference exists at subbands 1 and 2 at the corresponding time and MUST interference does not exist at subband 3. Therefore, the existence of MUST interference should be defined per frequency and time resources, signaled from the eNB to the UE or detected by the UE through blind decoding.

<Redefinition of MCS Field>

The following Table 3 is a related art MCS (Modulation and Coding Scheme) table.

TABLE 3

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

If two statuses are considered, it is preferable not to support the case that a modulation order of desired data is 6 during MUST.

First of all, since a low power is allocated to the near UE and a high power is allocated to the far UE, if data transmission is performed by a high modulation order such as 64QAM (that is, modulation order 6) even though geometry (for example, SNR) of the near UE is good, received reliability may be deteriorated remarkably.

Secondly, noise may occur when constellation symbols of a high modulation order are generated due to occurrence of EVM (error vector magnitude) generated when the eNB generates a transmission signal. Even though noise of the same size occurs, a minimum hamming distance between symbols is short in case of a high modulation order, whereby the UE is more affected by noise. As a result, decoding performance of the UE may be deteriorated. If the near UE uses 64QAM and the far UE uses a modulation order of 2 or more, a modulation order of superposition symbols becomes 8 or more. In this way, since the UE is greatly affected by noise due to EVM in a very high modulation order, it is preferable that a modulation order of any one UE is maintained at 4 or more during MUST.

For this reason, it is suggested that MCS indexes 17 to 28 and 31 should be used for another purpose of use (for example, MUST AI transfer). Additionally, since TBS indexes of MCS indexes 9 and 10 are the same as each other, MCS indexes 9 and 10 have the same spectral efficiency, whereby one of the two values may be used for another purpose of use (for example, MUST AI transfer). The greater a modulation order of a desired PDSCH is, the higher complexity of ML cancellation receiver is. Therefore, it is preferable to use the MCS index 10 having a high modulation order for another purpose of use.

Although the modulation order which is not supported is 6 as described above, this modulation order may be normalized to K. This K value may be reported from the UE to the eNB as UE capability, or may be determined by the eNB and then notified to the UE.

When the MCS index of which original purpose of use is not used is referred to as a reserved MCS index, a modulation order of a desired PDSCH and a modulation order of an interference PDSCH may be redefined at one time using the reserved MCS index and the legacy MCS index. Table 4 illustrates this example. In Table 4, redefinition based on the reserved MCS index is represented in MCS indexes 17-26 and 31, and the legacy MCS index has been redefined to indicate the modulation order of the interference PDSCH together with the modulation order of the desired PDSCH.

TABLE 4

| MCS Index $I_{MCS}$ | Modulation Order of desired PDSCH $Q_m$ | Modulation Order of interference PDSCH $Q_m$ | TBS index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 2 | 5 |
| 6 | 2 | 2 | 6 |
| 7 | 2 | 2 | 7 |
| 8 | 2 | 2 | 8 |
| 9 | 2 | 2 | 9 |
| 10 | 4 | 2 | 9 |
| 11 | 4 | 2 | 10 |
| 12 | 4 | 2 | 11 |
| 13 | 4 | 2 | 12 |
| 14 | 4 | 2 | 13 |
| 15 | 4 | 2 | 14 |
| 16 | 4 | 2 | 15 |
| 17 | 2 | 4 | 0 |
| 18 | 2 | 4 | 1 |
| 19 | 2 | 4 | 2 |
| 20 | 2 | 4 | 3 |
| 21 | 2 | 4 | 4 |
| 22 | 2 | 4 | 5 |
| 23 | 2 | 4 | 6 |
| 24 | 2 | 4 | 7 |
| 25 | 2 | 4 | 8 |
| 26 | 2 | 4 | 9 |
| 27 | reserved | reserved | reserved |
| 28 | reserved | reserved | reserved |
| 29 | 2 | 2 | reserved |
| 30 | 4 | 2 | |
| 31 | 2 | 4 | |

Alternatively, the modulation order of the desired PDSCH and power allocation offset may be redefined at one time using the reserved MCS index and the legacy MCS index. Table 5 illustrates this example. In Table 5, redefinition based on the reserved MCS index is represented in MCS indexes 17-26 and 31, and the legacy MCS index has been redefined to indicate the power allocation offset together with the modulation order of the desired PDSCH.

TABLE 5

| MCS Index $I_{MCS}$ | Modulation Order of desired PDSCH $Q_m$ | Power allocation offset | TBS Index $I_{TBS}$ |
|---|---|---|---|
| 0 | 2 | $Offset_S = x_0, Offset_I = x_1,$ | 0 |
| 1 | 2 | $Offset_S = x_0, Offset_I = x_1,$ | 1 |
| 2 | 2 | $Offset_S = x_0, Offset_I = x_1,$ | 2 |
| 3 | 2 | $Offset_S = x_0, Offset_I = x_1,$ | 3 |
| 4 | 2 | $Offset_S = x_0, Offset_I = x_1,$ | 4 |
| 5 | 2 | $Offset_S = x_0, Offset_I = x_1,$ | 5 |
| 6 | 2 | $Offset_S = x_0, Offset_I = x_1,$ | 6 |
| 7 | 2 | $Offset_S = x_0, Offset_I = x_1,$ | 7 |
| 8 | 2 | $Offset_S = x_0, Offset_I = x_1,$ | 8 |
| 9 | 2 | $Offset_S = x_0, Offset_I = x_1,$ | 9 |
| 10 | 4 | $Offset_S = x_2, Offset_I = x_3,$ | 9 |
| 11 | 4 | $Offset_S = x_2, Offset_I = x_3,$ | 10 |
| 12 | 4 | $Offset_S = x_2, Offset_I = x_3,$ | 11 |
| 13 | 4 | $Offset_S = x_2, Offset_I = x_3,$ | 12 |
| 14 | 4 | $Offset_S = x_2, Offset_I = x_3,$ | 13 |
| 15 | 4 | $Offset_S = x_2, Offset_I = x_3,$ | 14 |
| 16 | 4 | $Offset_S = x_2, Offset_I = x_3,$ | 15 |
| 17 | 2 | $Offset_S = x_4, Offset_I = x_5,$ | 0 |
| 18 | 2 | $Offset_S = x_4, Offset_I = x_5,$ | 1 |
| 19 | 2 | $Offset_S = x_4, Offset_I = x_5,$ | 2 |
| 20 | 2 | $Offset_S = x_4, Offset_I = x_5,$ | 3 |
| 21 | 2 | $Offset_S = x_4, Offset_I = x_5,$ | 4 |
| 22 | 2 | $Offset_S = x_4, Offset_I = x_5,$ | 5 |
| 23 | 2 | $Offset_S = x_4, Offset_I = x_5,$ | 6 |
| 24 | 2 | $Offset_S = x_4, Offset_I = x_5,$ | 7 |
| 25 | 2 | $Offset_S = x_4, Offset_I = x_5,$ | 8 |
| 26 | 2 | $Offset_S = x_4, Offset_I = x_5,$ | 9 |
| 27 | reserved | reserved | reserved |
| 28 | reserved | reserved | reserved |
| 29 | 2 | $Offset_S = x_0, Offset_I = x_1,$ | reserved |
| 30 | 4 | $Offset_S = x_2, Offset_I = x_3,$ | |
| 31 | 2 | $Offset_S = x_4, Offset_I = x_5,$ | |

In Table 5, Offsets and offset are values used when transmission powers of the desired PDSCH and the interference PDSCH are calculated, and are calculated by the UE through the following operation.

In case of CRS based TM (for example, TM 4), the UE measures a received power from a CRS and then primarily calculates a power of PDSCH by using PA and PB values which are RRC-signaled. This operation is the same as the legacy operation but the UE additionally estimates a power value scaled down as much as offsets from the primarily calculated PDSCH power (for example, P) as a desired PDSCH power for its data transmission power calculation. Likewise, the UE estimates the power value scaled down as much as offset from the primarily calculated PDSCH power (for example, P) as an interference PDSCH power.

On the other hand, according to the current LTE standard, in DM-RS based transmission modes (that is, TMs 9 and 10), a PDSCH transmission power is calculated by applying a specific offset based on a DM-RS received power. That is, 0 dB offset is applied to 2 layers or less, and 3 dB offset is applied to 3 layers or more. The PDSCH transmission power is primarily calculated like the legacy scheme and then the power value scaled down as much as offsets is estimated as the desired PDSCH power and the power value scaled down as much as offset is estimated as the interference PDSCH power.

The power offset values (i.e., values of X0, X1, X2, X3, X4 and X5) of Table 5 may be notified from the eNB to the UE through a higher layer signal but may be a fixed constant value. Also, the power offset values may be defined to always satisfy a relation equation of offset$_S$=1-offset$_I$, whereby only one of the two offset values may be notified.

In Table 5, if a desired modulation order is 4, a power offset is determined by one value. To allow a higher power offset, it is required to additionally reserve MCS index and redefine the higher power offset together with the reserved MCS index. For example, in addition to MCS indexes 17 to 28 and MCS index 31 and MCS index 10, which are already reserved, two MCS indexes of modulation order 4 may be reserved additionally. In detail, considering that a low power is allocated to the near UE and to increase reliability of desired data, MCS index 15 and MCS index 16 may be reserved. As a result, if desired modulation orders are 2 and 4 as listed in Table 6, two power offsets may be selected. In comparison with Table 5, new power offset of modulation order 4 has been added using newly reserved MCS index in Table 6. In detail, it is noted that new power offset of modulation order 4 has been added using MCS indexes 10, 15, 16, 27 and 28. As another example, various options may be provided in such a manner that MCS indexes 14 and 16 are reserved instead of MCS indexes 15 and 16.

TABLE 6

| MCS Index $I_{MCS}$ | Modulation Order of desired PDSCH $Q_m$ | Power allocation offset | TBS Index $I_{TBS}$ |
|---|---|---|---|
| 0 | 2 | $Offset_S = x_0, Offset_I = x_1,$ | 0 |
| 1 | 2 | $Offset_S = x_0, Offset_I = x_1,$ | 1 |
| 2 | 2 | $Offset_S = x_0, Offset_I = x_1,$ | 2 |
| 3 | 2 | $Offset_S = x_0, Offset_I = x_1,$ | 3 |
| 4 | 2 | $Offset_S = x_0, Offset_I = x_1,$ | 4 |
| 5 | 2 | $Offset_S = x_0, Offset_I = x_1,$ | 5 |
| 6 | 2 | $Offset_S = x_0, Offset_I = x_1,$ | 6 |
| 7 | 2 | $Offset_S = x_0, Offset_I = x_1,$ | 7 |
| 8 | 2 | $Offset_S = x_0, Offset_I = x_1,$ | 8 |
| 9 | 2 | $Offset_S = x_0, Offset_I = x_1,$ | 9 |
| 10 | 4 | $Offset_S = x_7, Offset_I = x_8,$ | 10 |
| 11 | 4 | $Offset_S = x_2, Offset_I = x_3,$ | 10 |
| 12 | 4 | $Offset_S = x_2, Offset_I = x_3,$ | 11 |
| 13 | 4 | $Offset_S = x_2, Offset_I = x_3,$ | 12 |
| 14 | 4 | $Offset_S = x_2, Offset_I = x_3,$ | 13 |
| 15 | 4 | $Offset_S = x_7, Offset_I = x_8,$ | 11 |
| 16 | 4 | $Offset_S = x_7, Offset_I = x_8,$ | 12 |
| 17 | 2 | $Offset_S = x_4, Offset_I = x_5,$ | 0 |
| 18 | 2 | $Offset_S = x_4, Offset_I = x_5,$ | 1 |
| 19 | 2 | $Offset_S = x_4, Offset_I = x_5,$ | 2 |
| 20 | 2 | $Offset_S = x_4, Offset_I = x_5,$ | 3 |
| 21 | 2 | $Offset_S = x_4, Offset_I = x_5,$ | 4 |
| 22 | 2 | $Offset_S = x_4, Offset_I = x_5,$ | 5 |
| 23 | 2 | $Offset_S = x_4, Offset_I = x_5,$ | 6 |
| 24 | 2 | $Offset_S = x_4, Offset_I = x_5,$ | 7 |
| 25 | 2 | $Offset_S = x_4, Offset_I = x_5,$ | 8 |
| 26 | 2 | $Offset_S = x_4, Offset_I = x_5,$ | 9 |
| 27 | 4 | $Offset_S = x_7, Offset_I = x_8,$ | 13 |
| 28 | 4 | $Offset_S = x_7, Offset_I = x_8,$ | reserved |
| 29 | 2 | $Offset_S = x_0, Offset_I = x_1,$ | reserved |
| 30 | 4 | $Offset_S = x_2, Offset_I = x_3,$ | |
| 31 | 2 | $Offset_S = x_4, Offset_I = x_5,$ | |

If a total of 16 states comprised of MCS indexes 17 to 28 and MCS indexes 31, 10, 15, and 16 are all changed to reserved states, the other MCS indexes may be expressed as 4 bits. Since MCS index field corresponding to each of two codewords exists, payload of a total of 2 bits which are saved may be used for AI transfer. The corresponding 2 bits may be used to transfer AI information (for example, modulation order, power offset, etc.) on interference MUST-transmitted to each of codeword 1 and codeword 2.

In 2 TX environment, since one layer exists per codeword, there is no problem even though AI information per codeword is provided. However, in an environment of 4 TX or more, since several layers may exist per codeword, if AI information per codeword is provided, ambiguity is generated as follows. For example, if two layers exist in the first codeword, it is ambiguous whether to apply AI for the first codeword to all of the two layers or one layer. To this end, the eNB needs to notify the UE of a layer to which AI should be applied, or the UE needs to discover a layer where MUST interference exists, through blind decoding, and apply AI of the corresponding codeword to only the layer where interference exists.

Alternatively, the 2 bits may be used at one time, whereby more elaborate AI information transmission may be performed. For example, power offset (x0, x1), power offset (x2, x3), power offset (x4, x5), and power offset (x6, x7) may be defined for states 00, 01, 10, 11 expressed as 2 bits, and power offset is applied to a value corresponding to codeword (or layer) to which MUST is applied. If MUST is applied to one of codeword 1 and codeword 2, power offset is applied to only a codeword to which MUST is applied, and transmission power is calculated for the other codeword like the legacy scheme. If MUST is applied to the two codewords, the same power offset value is applied to the two codewords.

As another method, the two bits may be used at one time, whereby AI information may be transferred by joint encoding. For example, if x0=1 and x1=0 are set, the eNB may notify the UE that MUST interference does not exist, through state 00, and may notify the UE that MUST interference exists and notify the UE of power offset when MUST interference exists, through the other states. In addition, the eNB may performs joint encoding for interference modulation order and power offset and notifies the UE of the joint encoding result as 2 bits.

In Table 3, if 13 states of which modulation order is 6 are cancelled, a total of 19 states are only valid. Since it is regarded that two tables to which MCS index per codeword is individually applied exists in the DCI, if states of which modulation order is 6 are cancelled from the two tables, only 19 states exist. In this case, two MCS tables are combined, a total of 19*19 (=361) states exist. Therefore, if states of which modulation order is 6 are cancelled and two MCS tables are subjected to joint encoding, MCS for two codewords may newly be defined by a total of 9 bits. Since 9 bits of MCS index field of 10 bits have been used, the other 1 bit may newly be used for transfer of AI information (for example, information on the existence of MUST interference, modulation order of interference PDSCH, power offset, etc.).

In the present invention, the legacy MCS table for supporting maximum modulation order 6 has been redefined but may be enlarged to the legacy MCS table for supporting maximum modulation order 8. In this case, MCS index for modulation order 8 may be cancelled, and AI and MCS index of desired PDSCH may be transferred together using reserved index.

<Redefinition of TPMI Field>

The following Table 7 is a TPMI (Transmission Precoding Matrix Indication) table corresponding to 2TX defined in the legacy DCI format 2.

TABLE 7

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 2 layers: Transmit diversity | 0 | 2 layers: Precoding corresponding to precoder matrix $\frac{1}{2}\begin{bmatrix} 1 & 1 \\ 1 & -1 \end{bmatrix}$ |
| 1 | 1 layer: Precoding corresponding to precoding vector $[1\ \ 1]^T/\sqrt{2}$ | 1 | 2 layers: Precoding corresponding to precoder matrix $\frac{1}{2}\begin{bmatrix} 1 & 1 \\ j & -j \end{bmatrix}$ |
| 2 | 1 layer: Precoding corresponding to precoder vector $[1\ \ -1]^T/\sqrt{2}$ | 2 | 2 layers: Precoding according to the latest PMI report on PUSCH, using the precoder(s) indicated by the reported PMI(s) |
| 3 | 1 layer: Precoding corresponding to precoder vector $[1\ \ j]^T/\sqrt{2}$ | 3 | reserved |
| 4 | 1 layer: Precoding corresponding to precoder vector $[1\ \ -j]^T/\sqrt{2}$ | 4 | reserved |
| 5 | 1 layer: Precoding according to the latest PMI report on PUSCH, using the precoder(s) indicated by the reported PMI(s), if RI = 2 was reported, using $1^{st}$ column multiplied by $\sqrt{2}$ of all precoders implied by the reported PMI(s) | 5 | reserved |
| 6 | 1 layer: Precoding according to the latest PMI report on PUSCH, using the precoder(s) indicated by the reported PMI(s), if RI = 2 was reported, using $2^{nd}$ column multiplied by $\sqrt{2}$ of all precoders implied by the reported PMI(s) | 6 | reserved |
| 7 | reserved | 7 | reserved |

The TPMI field of Table 7 may be redefined if MUST interference exists, and may be used for transfer of AI information and may transfer precoding information of the interference PDSCH as follows. Since 1 layer transmission is performed in case of 1 codeword in Table 7, the interference PDSCH uses the same precoding vector as that of the desired PDSCH if MUST interference exists. It is assumed that the UE knows the existence of MUST interference through separate signaling or blind decoding. In this case, additional precoding information is not required, and it may be assumed that the legacy TPMI indicates precoding of the interference PDSCH as well as precoding of the desired PDSCH. On the other hand, in case of 2 codewords in Table 7, interference may exist in two layers or one layer if MUST interference exists.

Therefore, in this case, the TPMI index may be redefined to indicate information on a layer where interference exists. For example, for each of TPMI Indexes 0, 1 and 2, it may be defined that MUST interference additionally exists in the first layer (or the first precoding vector) of the two layers (or two precoding vectors) in addition to the legacy information. For TPMI indexes 3, 4 and 5, 2 layer precoding information of TPMI indexes 0, 1 and 2 is defined and it may be defined that MUST interference additionally exists in the second layer (or the second precoding vector) of the two layers (or two precoding vectors).

As another example, for each of TPMI indexes 0, 1 and 2, it may be defined that MUST interference additionally exists in a random one layer (or the first precoding vector) of the two layers (or two precoding vectors) in addition to the legacy information. The UE may receive information as to a layer where MUST interference exists, through another field, or may discover the corresponding information by itself through blind decoding. For TPMI indexes 3, 4 and 5, 2 layer precoding information of TPMI indexes 0, 1 and 2 is defined and it may be defined that MUST interference additionally exists in all the two layers (or two precoding vectors).

The following Table 8 is a TPMI table corresponding to 4TX defined in the legacy DCI format 2.

TABLE 8

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . | . |
| . | . | . | . |
| . | . | 15 | 2 layers: TPMI = 15 |
| . | . | | |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | . | . |
| . | . | . | . |
| . | . | 32 | 3 layers: TPMI = 15 |
| . | . | | |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |

TABLE 8-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 35-63 | reserved | 35 | 4 layers: TPMI = 1 |
| | | . | . |
| | | . | . |
| | | 49 | 4 layers: TPMI = 15 |
| | | 50 | 4 layers: Precoding according to the latest PMI report on PUSCH using the precoder(s) indicated by the reported PMI(s) |
| | | 51-63 | Reserved |

The field of Table 8 may also be redefined if MUST interference exists, and may be used for transfer of AI information and may transfer precoding information of the interference PDSCH as follows.

Since 1 or 2 layer transmission is performed in case of 1 codeword in Table 8, the interference PDSCH uses the same precoding vector as that of the desired PDSCH if MUST interference exists in 1 layer. Therefore, in this case, additional precoding information is not required, and it may be assumed that the legacy TPMI indicates precoding of the interference PDSCH as well as precoding of the desired PDSCH. It is assumed that the UE has discovered the existence of MUST interference through separate signaling or blind decoding.

On the other hand, if 2 layer transmission is performed in 1 codeword, interference may exist in two layers or one layer. Therefore, in this case, the TPMI index may be redefined to indicate information on a layer where interference exists.

For example, for each of TPMI Indexes 18 to 34, it may be defined that MUST interference additionally exists in the first layer (or the first precoding vector) of the two layers (or two precoding vectors) in addition to the legacy information. For TPMI indexes 35 to 51, 2 layer precoding information of TPMI indexes 18 to 34 is defined and it may be defined that MUST interference additionally exists in the second layer (or the second precoding vector) of the two layers (or two precoding vectors).

As another example, for each of TPMI indexes 18 to 34, it may be defined that MUST interference additionally exists in a random one layer (or the first precoding vector) of the two layers (or two precoding vectors) in addition to the legacy information. The UE may receive information as to a layer where MUST interference exists, through another field, or may discover the corresponding information by itself through blind decoding. For TPMI indexes 35 to 51, 2 layer precoding information of TPMI indexes 18 to 34 is defined and it may be defined that MUST interference additionally exists in all the two layers (or two precoding vectors).

In case of 2 codewords of Table 8, 13 states of TPMI indexes 51 to 63 exist as reserved states. Since reserved states which will newly be defined and used are not sufficient, it is required to ensure more reserved states by reserving all states of 3 layers or more. That is, if MUST interference exists, it is restricted that 2 codewords of Table 6 do not support layer 3 or more. For each of TPMI indexes 0 to 16, it may be defined that MUST interference additionally exists in a random one layer (or the first precoding vector) of the two layers (or two precoding vectors) in addition to the legacy information. Also, for TPMI indexes 17 to 33, 2 layer precoding information of TPMI indexes 0 to 16 is defined and it may be defined that MUST interference additionally exists in the second layer (or the second precoding vector) of the two layers (or two precoding vectors). Also, for TPMI indexes 34 to 50, 2 layer precoding information of TPMI indexes 0 to 16 is defined and it may be defined that MUST interference additionally exists in all the two layers.

In the above suggestion, precoding of MUST interference or layer information where MUST interference exists has been additionally defined in the TPMI field. In addition, random AI information such as modulation order of the interference PDSCH may be redefined in the TPMI field and transferred.

<Redefinition of DM-RS Field>

The following Table 9 is a DM-RS field table defined in the legacy DCI formats 2C and 2D.

TABLE 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

A corresponding 3-bit field may also be redefined and thus used for AI transfer. For example, in case of 1 codeword, value 1 and value 3 corresponding to nSCID=1 are cancelled and then reserved, whereby the existence of MUST interference may be indicated by redefinition performed such that the value 1 indicates [1 layer, port 7, nSCID=0, and MUST interference exists] and the value 3 indicates [1 layer, port 8, nSCID=0, and MUST interference exists]. At this time, the existing value 0 and value 2 indicate that MUST interference does not exist.

For another example, values 0, 1, 2 and 3 are all set to nSCID=0 and then various kinds of AI such as power offset or modulation order may be redefined additionally. That is, value 0 is redefined as [1 layer, port 7, $n_{SCID}$=0, power offset (x0, x1)], value 1 is redefined as [1 layer, port 7, $n_{SCID}$=0, power offset (x2, x3)], value 2 is redefined as [1 layer, port 8, $n_{SCID}$=0, power offset (x4, x5)], and value 3 is redefined as [1 layer, port 8, $n_{SCID}$=0, power offset (x6, x7)].

For still another example, if MUST interference is limited to a single layer, values 4, 5, 6 and 7 are defined by the same messages as the values 0,1,2 and 3 and then information such as power offset, modulation order and the existence of MUST interference may be defined additionally for a value pair (for example, value 4 and value 0) having the same message.

On the other hand, in case of 2 codewords, values of high layers (for example, 5 layer or more) are cancelled, reserved and redefined, whereby AI transfer may be performed. For example, values 4, 5, 6, 7 are defined by the same messages as the values 0, 1, 2, 3 and then information such as power offset, modulation order and the existence of MUST interference may be defined additionally for a value pair (for example, value 4 and value 0) having the same message. That is, value 4 may indicate [2 layers, ports 7-8, $n_{SCID}$=0, the existence of MUST interference], and value 0 may indicate [2 layers, ports 7-8, $n_{SCID}$=0, non-existence of MUST interference]. Alternatively, value 4 may indicate [2 layers, ports 7-8, $n_{SCID}$=0, power offset (x0, x1)], and value 0 may indicate [2 layers, ports 7-8, $n_{SCID}$=0, power offset (x2, x3)].

Table 10 is an example of DM-RS information redefined when MUST interference exists. Particularly, power offset ($x_i$, $x_j$) means Offsets=$x_i$, and Offset$_1$=$x_j$, and Offsets and Offset are defined as described above. The existence of MUST interference may be known by the UE through blind decoding or another signaling.

TABLE 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 Power offset: (x32, x33) | 0 | 2 layers, ports 7-8, $n_{SCID}$ = 0, Power offset for layer 1 corresponding port 7: (x0, x1), Power offset for layer 2 corresponding port 8: (x2, x3) |
| 1 | 1 layer, port 7, $n_{SCID}$ = 1 Power offset: (x34, x35) | 1 | 2 layers, ports 7-8, $n_{SCID}$ = 0, Power offset for layer 1 corresponding port 7: (x4, x5), Power offset for layer 2 corresponding port 8: (x6, x7) |
| 2 | 1 layer, port 8, $n_{SCID}$ = 0 Power offset: (x36, x37) | 2 | 2 layers, ports 7-8, $n_{SCID}$ = 0, Power offset for layer 1 corresponding port 7: (x8, x9), Power offset for layer 2 corresponding port 8: (x10, x11) |
| 3 | 1 layer, port 8, $n_{SCID}$ = 1 Power offset: (x38, x39) | 3 | 2 layers, ports 7-8, $n_{SCID}$ = 0, Power offset for layer 1 corresponding port 7: (x12, x13), Power offset for layer 2 corresponding port 8: (x14, x15) |
| 4 | 1 layer, port 7, $n_{SCID}$ = 0 Power offset: (x40, x41) | 4 | 2 layers, ports 7-8, $n_{SCID}$ = 1, Power offset for layer 1 corresponding port 7: (x16, x17), Power offset for layer 2 corresponding port 8: (x18, x19) |
| 5 | 1 layer, port 7, $n_{SCID}$ = 1 Power offset: (x42, x43) | 5 | 2 layers, ports 7-8, $n_{SCID}$ = 1, Power offset for layer 1 corresponding port 7: (x20, x21), Power offset for layer 2 corresponding port 8: (x22, x23) |
| 6 | 1 layer, port 8, $n_{SCID}$ = 0 Power offset: (x44, x45) | 6 | 2 layers, ports 7-8, $n_{SCID}$ = 1, Power offset for layer 1 corresponding port 7: (x24, x25), Power offset for layer 2 corresponding port 8: (x26, x27) |
| 7 | 1 layer, port 8, $n_{SCID}$ = 1 Power offset: (x46, x47) | 7 | 2 layers, ports 7-8, $n_{SCID}$ = 1, Power offset for layer 1 corresponding port 7: (x28, x29), Power offset for layer 2 corresponding port 8: (x30, x31) |

Maximum layer is limited to 2 during 2 codeword transmission, and as a result, retransmission of 2 layers or more does not occur in 1 codeword. Power offset information may be transferred, as listed in Table 10, by using reserved values obtained by this layer limitation. The eNB may notify the UE of xk (k=0, 1, 2, . . . , 47) through a higher layer signal, or it may be defined that xk always has a fixed constant value. Also, some xk values may be the same values.

<Redefinition of RV Field and Swapping Flag Field During MUST Transmission of Single Codeword>

A restriction is given such that MUST is performed only if the number of codewords of the near UE is 1. In this case, more fields of DCI may be used to provide AI. For example, if single codeword transmission is performed as codeword 2 of the near UE is disabled, RV (redundancy version) field of 2-bit size used for codeword 2 in DCI and a swapping flag field which is not used in single codeword transmission may be used to provide AI. In more detail, the swapping flag field may be redefined to indicate the existence of MUST interference, and the RV field may be used to transfer power offset information.

Alternatively, RV field and MCS index field of codeword 2 may be redefined to indicate AI (for example, the existence of MUST interference, modulation order of MUST interference, power offset, etc.). According to the current standard document, if MCS index of codeword 2 is 0 and RV is 1, codeword 2 is disabled. In this case, redefinition may be performed such that codeword 2 is disabled even in the case that MCS index of codeword 2 is 0 and RV is 2. As a result, AI corresponding to 1 bit may be transferred to the UE depending on whether RV is 1 or 2 if MCS index is 0. For example, if MCS index of codeword 2 is 0 and RV is 1, codeword 2 is disabled and it indicates MUST interference does not exist. If MCS index of codeword 2 is 0 and RV is 2, codeword 2 is disabled and it indicates MUST interference exists.

<PMI of Far UE>

Meanwhile, when data of the far UE and data of the near UE are transmitted by MUST system, the near UE should know a precoder, that is, PMI, of the far UE if precoders (or beams) applied to two data are different from each other. However, as described above, a problem occurs in that the amount of calculation is increased in order that the near UE performs blind decoding for PMI of the far UE. As one method for solving this problem, the far UE may notify the near UE of a CBSR (codebook subset restriction) value of far UE PMI when performing blind decoding for PMI of the far UE, and the near UE may perform blind decoding for PMI within only PMI that satisfies CBSR. However, as PMI of the far UE is restricted due to CBSR, another problem occurs in that throughput of the far UE is degraded.

To solve this problem, in the present invention, the eNB defines subframe set #0 to subframe set #(N−1) by dividing a subframe (or RB corresponding to a frequency resource) corresponding to a time resource into N sets, and signals the defined subframe sets to the near UE through RRC. If the eNB performs MUST per subframe set, the eNB signals, to the near UE, CBSR information in which PMI of the far UE will be restricted, through RRC. If MUST is performed at a subframe which belongs to subframe set #i, the near UE performs blind decoding for PMI within only PMI that satisfies CBSR (that is, CBSR #i) of the far UE, which corresponds to subframe set #i.

In this case, since the eNB has a plurality of CBSRs for the far UE instead of one CBSR, if PMI fed back from the far UE is not defined in CBSR #n corresponding to subframe #n, the PMI is on standby until next subframe defined by another DBSR and then data transmission is performed for the far UE, whereby throughput degradation of the far UE due to CBSR restriction may be minimized.

Otherwise, the near UE may reduce a blind decoding range of PMI of the far UE based on its rank. For example, supposing that 4Tx CRS port is set, since PMI of the far UE is 16 per rank, a total of 64 search spaces for blind decoding exist. To reduce this, if a rank of the near UE is n, the near UE may assume that a rank of the far UE is also N. A rank relation between the near UE and the far UE may be signaled from the eNB to the UE. Supposing that the rank of the near UE is the same as that of the far UE, the near UE may detect PMI of the far UE by performing blind decoding for 16 PMIs corresponding to rank n among 64.

Otherwise, the eNB may notify the near UE of allocated RB information of the far UE or the number of layers to assist the near UE in performing blind decoding for a precoder of the far UE. In 4TX CRS, the number of layers (=ranks) may be notified to reduce blind decoding amount of the near UE. Although the eNB may directly notify the number of layers by using multiple bits, the eNB may simply signal whether its layers are the same as the number of layers of the near UE, through 1 bit.

<PDSCH Starting Symbol>

In MUST, the far UE and the near UE exist in the same cell but their respective PDSCH starting symbols different from each other may be configured if CCS (Cross carrier scheduling) is performed in view of CA (Carrier Aggregation). Therefore, the near UE should know PDSCH starting symbol of the far UE through the following method to cancel data of the far UE, that is, interference.

The eNB may provide the near UE of the MUST system whether its PDSCH starting symbol is the same as the starting symbol of the far UE, semi-statically through RRC signaling, or may indicate whether its PDSCH starting symbol is the same as the starting symbol of the far UE, dynamically by using DCI. Also, the near UE does not expect that its PDSCH starting symbol is different from the PDSCH starting symbol of the far UE, and the eNB makes sure of this.

Whether the near UE may derive an interference PDSCH starting symbol using PCFICH received by itself may be defined by one state together with PDSCH IC starting symbol as listed in Table 11 below.

TABLE 11

| bit fields | descriptions |
| --- | --- |
| 001 | follow PCFICH |
| 010 | n = 2 |
| 011 | n = 3 |
| 100 | n = 4 |
| 101 | n = 5 |
| 000, 110, 111 | reserved |

In this case, the PDSCH IC starting symbol indicates a symbol for correcting PDSCH transmission of the far UE through a transmitter instead of actual starting symbol of PDSCH. This will be described with the following drawing.

Figure 10:
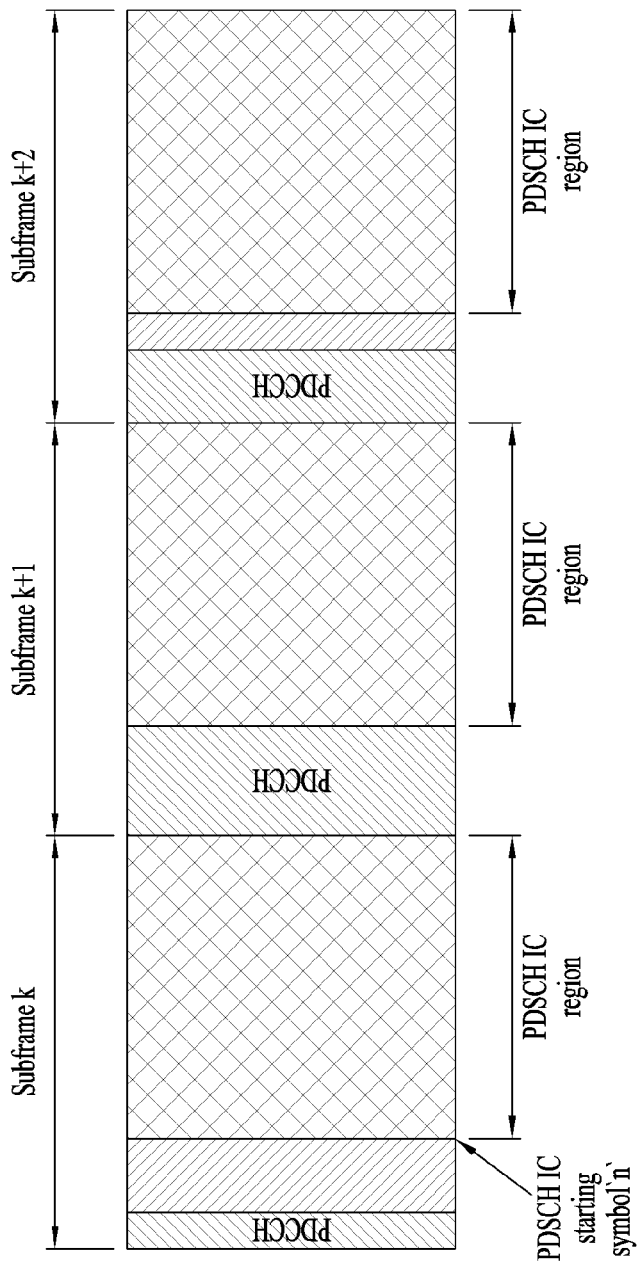
FIG. 10 is a diagram illustrating a concept of PDSCH IC starting symbol.

FIG. 10 is a diagram illustrating a concept of PDSCH IC starting symbol.

Referring to FIG. 10, although the actual starting symbol of PDSCH is known by the PCFICH, if the PDSCH IC starting symbol is configured (that is, if index of PDSCH IC starting symbol is given to n), the UE may try to cancel interference from the PDSCH IC starting symbol regardless of the index of the actual starting symbol of PDSCH.

The n signaled in Table 11 may mean the PDSCH starting symbol actually used by an interference eNB not the PDSCH IC starting symbol.

Alternatively, as listed in Table 12 below, RRC signaling allows only the PDSCH IC starting symbol to be signaled, and may be scheduled so as not to be transmitted if the near UE may assume that its starting symbol is the same as the interference PDSCH starting symbol. That is, if signaling is not received, the UE may derive the interference PDSCH starting symbol by using its PCFICH.

TABLE 12

| bit fields | descriptions |
|---|---|
| 001 | n = 2 |
| 010 | n = 3 |
| 011 | n = 4 |
| 100 | n = 5 |

<Signaling as to DM-RS Power Boosting of Far UE>

If data of the far UE are transmitted based on DM-RS based TM, the near UE may discover a precoder of far UE data from DM-RS of the far UE, and may also know a data transmission power of far UE data. This is because that the DM-RS in which a precoder is already reflected is transmitted unlike CRS, and is transmitted at the same power as that of CRS in case of a rank or less. That is, the far UE may perform interference cancellation by measuring a DM-RS power of the far UE and assuming the DM-RS power as a data power of the far UE.

However, the data power and the DM-RS power are the same as each other in case of a rank or less but the DM-RS power is more boosted than the data power as much as 3 dB. Therefore, a problem may occur if the near UE performs interference cancellation by assuming that the DM-RS power of the far UE is always the same as the data power of the far UE.

As a result, the UE should know whether the DM-RS power of the far UE is the same as the data power of the far UE or the DM-RS power of the far UE has been more boosted than the data power of the far UE as much as 3 dB. To this end, the present invention suggests the following methods.

The near UE expects that the DM-RS power of the far UE is not different from (or the same as) the data power of the far UE and the eNB ensures that the DM-RS power of the far UE is the same as the data power of the far UE. In the same sense, the near UE may expect that a rank of the far UE which receives DM-RS is 2 or less, or expects that DM-RS overhead of the far UE corresponds to 12 REs per PRB.

The eNB may dynamically or semi-statically signal to the near UE whether the DM-RS power of the far UE is the same as the data power of the far UE or the DM-RS power of the far UE has been more boosted than the data power of the far UE as much as 3 dB. Alternatively, the near UE signals whether a rank of the far UE which receives DM-RS is 2 or less or DM-RS overhead of the far UE corresponds to 12 REs per PRB or 24 REs per PRB.

<Relation Between LD CDD (Large Delay-Cyclic Delay Diversity) Transmission Scheme and MUST System>

When the near UE and the far UE, which belong to 4TX antenna eNB, receive data through LD CDD transmission, precoders of the two UEs may be the same as or different from each other depending on scheduled RBs and layers of the two UE if MUST is performed. For example, if the two UEs are different from each other in the number of layers, since change units of W of the two UEs beam cycled by LD CDD are different from each other, the precoders of the two UEs may be different from or the same as each other depending RE (resource element). Alternatively, if the scheduled RBs of the two UEs are different from each other even though the two UEs are the same as each other in the number of layers, the precoders of the two UEs may be different from or the same as each other depending on RE.

On the other hand, if the scheduled RBs of the two UEs and the number of layers of the two UEs are the same as each other, the precoders of the two UEs are always the same as each other. In order that the near UE normally cancels data of the far UE, it is necessarily required to know the precoder of the far UE. In this way, in LD CDD MUST, the precoders may be the same as or different from each other as the case may be. To apply LD CDD MUST to the case that the precoders are different from each other, since the precoders should be signaled or blind-decoded, the system becomes complicated. To solve this, if the near UE receives data through LD CDD transmission and receives data through MUST, the near UE does not expect that its precoder is different from the precoder of the far UE, which is subjected to MUST, and the eNB should make sure of this. Alternatively, the eNB should signal to the near UE whether the precoder of the far UE is the same as or different from the precoder of the near UE.

<MUST Capability Information of UE>

The UE should define its capability of receiving MUST signal and canceling interference from a MUST paired UE as MUST capability information and report this to the eNB.

Since data of the UE are allocated in such a manner a transmission power is shared by data of the MUST paired UE, a UE which receives data at a small transmission power may be defined as a near UE, and a UE which receives data at a relatively great power may be defined as a far UE. At this time, since the near UE is affected by big interference from the far UE, the near UE should have a capability of canceling interference from the far UE. On the other hand, since the far UE receives small interference from the near UE, the far UE does not need the capability of canceling interference necessarily. If the far UE has the capability of canceling interference of the near UE, it may assist throughput improvement.

Considering this, MUST capability information may be defined by being categorized into two types of cases.

MUST capability information 1: if the UE is the near UE, the UE may cancel interference of the far UE but if the UE becomes the far UE, the UE cannot cancel near UE interference.

MUST capability information 2: if the UE is the near UE, the UE may cancel interference of the far UE. Even though the UE becomes the far UE, the UE may cancel near UE interference.

The eNB indicates that interference does not exist if the UE which has reported MUST capability information 1 is scheduled to the far UE, through signaling as to the existence of MUST interference. This is because that this UE regards that it is a MUST near UE if it is indicated that interference exists, and will start interference cancellation for the far UE, and as a result the corresponding UE will be failed in its data decoding.

On the other hand, the eNB indicates that interference exists if the UE which has reported MUST capability information 2 is scheduled to the far UE, through signaling as to the existence of MUST interference. This is because that this UE verifies whether it is a MUST near UE or a far UE (or this UE is signaled from the eNB with respect to the near UE or the far UE) and can cancel interference even though it is verified as the far UE.

That is, if the UE which has reported MUST capability information 1 is indicated that interference exists, the UE performs interference cancellation by assuming that it is the near UE. If the UE which has reported MUST capability information 1 is indicated that interference does not exist, the UE does not try to cancel interference. On the other hand, if the UE which has reported MUST capability information 2 is indicated that interference exists, the UE performs interference cancellation in any case by assuming that it is the near UE or the far UE. If the corresponding UE is scheduled by normal SU MIMO or MU MIMO instead of MUST, the eNB indicates that MUST interference does not exist, and the UE does not try to cancel interference.

Alternatively, instead of categorizing MUST capability information into two types of cases, the MUST capability information may be defined as information having capability of simply canceling interference from the far UE. That is, if the UE is the far UE, it is not considered whether the UE can cancel MUST interference of the near UE. Therefore, MUST interference may be canceled or nor depending UE implementation. This will be referred to as MUST capability information 0. The UE which has reported MUST capability information 0 may be signaled the existence or nonexistence of interference from the eNB and then may interpret the signaled detail as follows.

If the UE is signaled that interference exists, the operation of the MUST UE is categorized into two types depending on implementation. If the UE is implemented to cancel interference from the far UE, the UE performs blind decoding for interference from the near UE, and cancels interference if interference exists. If the UE is implemented to cancel interference from the near UE, the UE does not cancel interference by relying on signaling of the eNB.

Meanwhile, various methods for enabling the eNB to notify the MUST UE of interference information through DCI may exist. Basically, the eNB may enlarge the legacy DCI format by adding a new field for interference information to the legacy DCI format, thereby notifying the interference information. This will be referred to as enlarged DCI. However, if a payload size of a new field is increased, since a decoding success rate of DCI may be reduced, a size of interference information is very restrictive. Therefore, it is preferable to introduce a new DCI format independent from the legacy DCI format and use the new DCI format for more detailed interference information transfer. This DCI format will be referred to as independent DCI.

In this case, since the UE should perform blind decoding for DCI format 1A for fall back operation, the legacy DCI format defined depending on a transmission mode, and independent DCI format which is new DCI having interference information, higher complexity is required. Therefore, it is preferable that the UE reports to the eNB whether the UE has capability capable of receiving independent DCI for interference information.

The UE having capability capable of receiving independent DCI format performs MUST signal reception by performing blind decoding for DCI format 1A for fall back operation, the legacy DCI format corresponding to a transmission mode, and independent DCI. If the amount of interference information is not great, the eNB may transmit interference information to the UE through the enlarged DCI. If the amount of interference information is great, the eNB transmits interference information through the independent DCI. The eNB may notify the UE through a high layer control signal such as RRC signaling whether to transmit the enlarged DCI or independent DCI.

The UE having no capability capable of receiving independent DCI receives MUST signal by performing blind decoding for the enlarged DCI in which an interference information field is added to the legacy DCI format and DCI format 1A for fall back operation.

Figure 11:
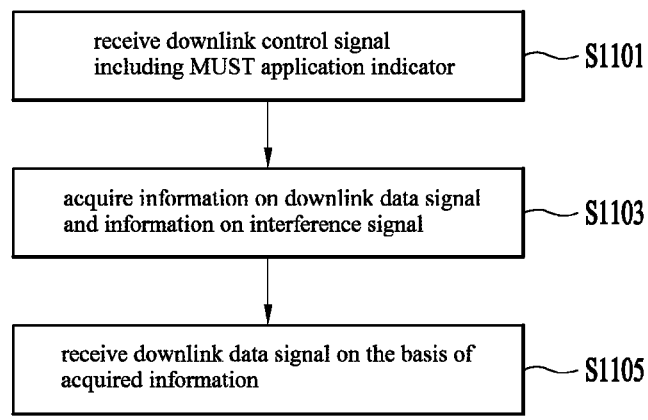
FIG. 11 is a flow chart illustrating a method for receiving a downlink signal in a MUST UE in accordance with the embodiment of the present invention.

FIG. 11 is a flow chart illustrating a method for receiving a downlink signal in a MUST UE in accordance with the embodiment of the present invention.

Referring to FIG. 11, the UE receives a downlink control signal from the eNB in step S1101. Particularly, the downlink control information includes MUST (Multi-User Superposition Transmission) application indicator, that is, signaling as to the existence of MUST interference.

If the MUST application indicator has a predetermined value, the MUST system has been applied in detail. If information indicating that a signal for MUST paired UE acts as interference is indicated, the UE acquires information for the downlink data signal and information for an interference signal in step S1103. Preferably, the interference signal is a downlink data signal of another MUST paired UE. Finally, the UE receives the downlink data signal on the basis of the information for the downlink data signal and the information for the interference signal in step S1105. However, the UE may perform the aforementioned steps by previously reporting information on the existence of control capability of the interference signal to the eNB.

More preferably, the information for the downlink data signal may include a modulation order and a transport block size of the downlink data signal of the UE, and may include a modulation order of a downlink data signal of another UE. Alternatively, the information for the downlink data signal may include power information of the downlink data signal of the UE, and may include power information of a downlink data signal of another UE.

Alternatively, the downlink control information may include information as to whether a power of the downlink data signal of another UE is the same as that of a downlink reference signal for the downlink data signal of another UE. Additionally, the downlink control information may include information as to whether a precoder applied to the downlink data signal is the same as a precoder applied to the interference signal. However, these kinds of information may be provided semi-statically and separately through a higher layer not downlink control information.

Figure 12:
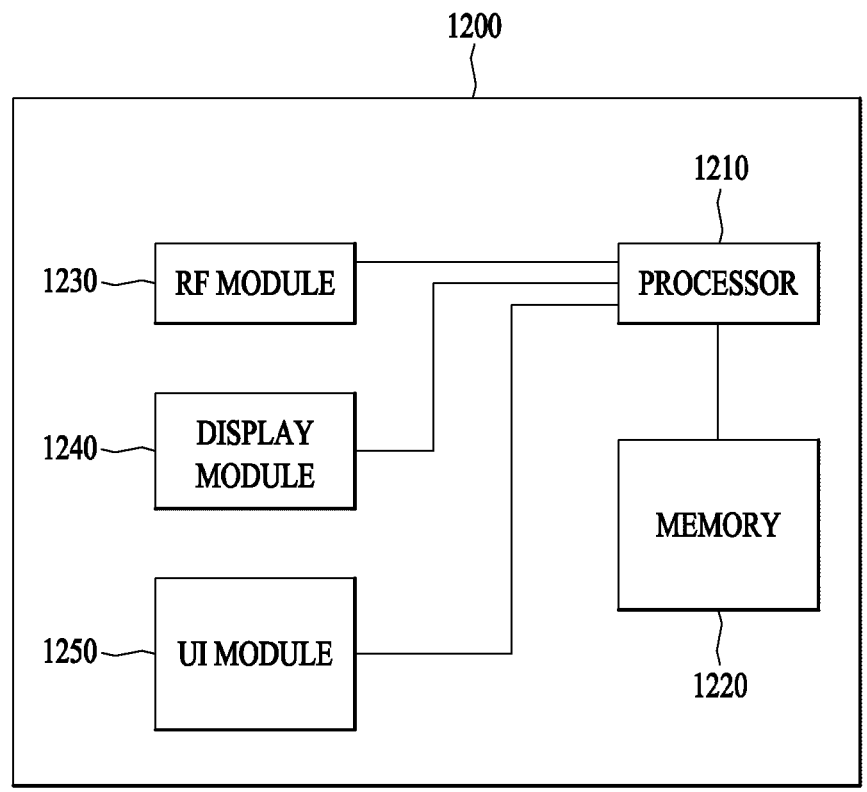
FIG. 12 is a block diagram of a communication apparatus according to an embodiment of the present invention.

FIG. 12 is a block diagram of a communication apparatus according to an embodiment of the present invention.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the method for transmitting control information for MUST (Multi-User Superposition Transmission) in a wireless communication system and the device therefor have been described based on the 3GPP LTE system, the method and the device are applicable to various wireless communication systems in addition to the 3GPP LTE system.

The invention claimed is:

1. A method of receiving a physical downlink shared channel (PDSCH) from a base station by a user equipment (UE) in a wireless communication system, the method comprising:
   reporting, to the base station, information on whether the UE has a capability to support a multi-user superposition transmission (MUST),
   receiving downlink control information (DCI) from the base station; and
   receiving the PDSCH from the base station based on the DCI,
   wherein the DCI includes information on a modulation order related to the PDSCH,
   wherein the DCI includes a field for informing about presence of a MUST interference, based on the MUST being applied for the PDSCH,
   wherein, based on the field being included in the DCI, the field further includes information on a modulation order related to a MUST interference signal,
   wherein a bit length of the field in the DCI is different based on a different number of spatial layers related to the MUST interference signal, and
   wherein the UE expects that the starting symbol of the MUST interference signal is the same as the starting symbol of the PDSCH, without any signaling from the base station.

2. The method of claim 1, wherein the MUST interference signal is a PDSCH of another UE which is MUST paired.

3. The method of claim 1, wherein the DCI includes information about whether or not a precoder applied to the PDSCH is the same as a precoder applied to the MUST interference signal.

4. A user equipment (UE) in a wireless communication system, the UE comprising:
   a radio frequency (RF) unit; and
   a processor configured to control the RF unit,
   wherein the processor is configured to report information on whether the UE has a capability to support a multi-user superposition transmission (MUST) to a base station, receive downlink control information (DCI) from the base station, and to receive a physical downlink shared channel (PDSCH) from the base station based on the DCI,
   wherein the DCI includes information on a modulation order related to the PDSCH,
   wherein the DCI includes a field for informing about presence of a MUST interference, based on the MUST being applied for the PDSCH,
   wherein, based on the field being included in the DCI, the field further includes information on a modulation order related to a MUST interference signal,
   wherein a bit length of the field in the DCI is different based on a different number of spatial layers related to the MUST interference signal, and
   wherein the processor is further configured to expect that the starting symbol of the MUST interference signal is the same as the starting symbol of the PDSCH, without any signaling from the base station.

5. The UE of claim 4, wherein the MUST interference signal is a PDSCH of another UE which is MUST paired.

6. The UE of claim 4, wherein the DCI includes information about whether or not a precoder applied to the PDSCH is the same as a precoder applied to the MUST interference signal.

\* \* \* \* \*